(12) United States Patent
Voronin et al.

(10) Patent No.: US 8,061,454 B2
(45) Date of Patent: Nov. 22, 2011

(54) ULTRA-HARD AND METALLIC CONSTRUCTIONS COMPRISING IMPROVED BRAZE JOINT

(75) Inventors: Georgiy Voronin, Orem, UT (US); J. Daniel Belnap, Pleasant Grove, UT (US)

(73) Assignee: Smith International, Inc., Houston, TX (US)

( * ) Notice: Subject to any disclaimer, the term of this patent is extended or adjusted under 35 U.S.C. 154(b) by 647 days.

(21) Appl. No.: 11/971,891

(22) Filed: Jan. 9, 2008

(65) Prior Publication Data

US 2009/0173547 A1 Jul. 9, 2009

(51) Int. Cl.
*E21B 10/36* (2006.01)

(52) U.S. Cl. .......................... 175/426; 175/434; 175/435

(58) Field of Classification Search .................. 175/374, 175/375, 425, 435
See application file for complete search history.

(56) References Cited

U.S. PATENT DOCUMENTS

| | | |
|---|---|---|
| 4,186,628 A | 2/1980 | Bonnice |
| 4,199,035 A | 4/1980 | Thompson |
| 4,200,159 A | 4/1980 | Peschel et al. |
| 4,729,440 A | 3/1988 | Hall |
| 4,850,523 A | 7/1989 | Slutz |
| 4,899,922 A | 2/1990 | Slutz et al. |
| 5,012,863 A | 5/1991 | Springer |
| 5,049,164 A | 9/1991 | Horton et al. |
| 5,373,908 A | 12/1994 | Pastusek |
| 5,967,249 A | 10/1999 | Butcher |
| 6,213,380 B1 | 4/2001 | Collins et al. |
| 6,742,611 B1 | 6/2004 | Illerhaus et al. |
| 7,389,834 B1 | 6/2008 | Kembaiyan |
| 7,487,849 B2 | 2/2009 | Radtke |
| 7,757,793 B2 * | 7/2010 | Voronin et al. ............... 175/435 |
| 2003/0079916 A1 | 5/2003 | Oldham |
| 2003/0084894 A1 | 5/2003 | Sung |
| 2005/0087371 A1 | 4/2005 | Kembaiyan |
| 2005/0089440 A1 | 4/2005 | Kembaiyan |
| 2005/0103533 A1 | 5/2005 | Sherwood, Jr. et al. |
| 2005/0230156 A1 | 10/2005 | Belnap et al. |
| 2005/0263328 A1 | 12/2005 | Middlemiss |
| 2006/0191723 A1 | 8/2006 | Keshavan |
| 2006/0254830 A1 * | 11/2006 | Radtke .......................... 175/426 |
| 2007/0023206 A1 | 2/2007 | Keshavan et al. |

(Continued)

FOREIGN PATENT DOCUMENTS

EP 0 295 151 A2 12/1988

(Continued)

OTHER PUBLICATIONS

Search Report for corresponding British Patent Application GB 0900060.5 dated Apr. 9, 2009, total 3 pages.

(Continued)

*Primary Examiner* — William P Neuder
*Assistant Examiner* — Yong-Suk Ro

(57) ABSTRACT

An ultra-hard and metallic construction comprises an ultra-hard component that is attached to a metallic component via a braze joint. The braze joint is interposed between the ultra-hard component and the metallic component, and comprises a first braze material bonded to a surface of the ultra-hard component. The braze joint includes an intervening layer in direct contact with the first braze material, and that is formed from a rigid material. The braze joint further comprises a second braze material that is interposed between the intervening layer and the metallic component, and that is different from the first braze material.

24 Claims, 5 Drawing Sheets

U.S. PATENT DOCUMENTS

| | | |
|---|---|---|
| 2007/0056776 A1 | 3/2007 | Overstreet |
| 2007/0079994 A1 | 4/2007 | Middlemiss |
| 2007/0102199 A1 | 5/2007 | Smith et al. |
| 2007/0131459 A1 | 6/2007 | Voronin et al. |
| 2007/0205023 A1 | 9/2007 | Hoffmaster |
| 2007/0278017 A1 | 12/2007 | Shen et al. |
| 2008/0029310 A1 | 2/2008 | John |
| 2008/0128176 A1 | 6/2008 | Choe |
| 2008/0164070 A1 | 7/2008 | Keshavan |
| 2008/0230279 A1 | 9/2008 | Bitler |
| 2009/0102588 A1* | 4/2009 | Sigler et al. ............ 336/62 |
| 2009/0173014 A1 | 7/2009 | Voronin et al. |
| 2009/0173548 A1 | 7/2009 | Voronin |
| 2010/0187020 A1 | 7/2010 | Zhang et al. |

FOREIGN PATENT DOCUMENTS

| | | |
|---|---|---|
| FR | 2774420 A1 | 8/1999 |
| GB | 2351987 A | 1/2001 |
| GB | 2422394 A | 7/2006 |
| GB | 2427215 A | 12/2006 |
| GB | 2431948 A | 5/2007 |
| SU | 1803518 A1 | 3/1993 |
| WO | 9929465 | 6/1999 |

OTHER PUBLICATIONS

Examination Report dated Nov. 23, 2009 for corresponding Irish Application No. 2008/1014 filed Dec. 19, 2008.

Response dated Feb. 23, 2010 to Exam Report for corresponding Irish Application No. 2008/1014 filed Dec. 19, 2008.

* cited by examiner

ULTRA-HARD AND METALLIC CONSTRUCTIONS COMPRISING IMPROVED BRAZE JOINT

FIELD OF THE INVENTION

This invention generally relates to constructions comprising an ultra-hard component and a metallic component that are brazed together and, more particularly, to such a construction that is formed using a braze joint that is designed and/or formed from materials that operate to provide optimal bond strength between such components, thereby operating to improve the service life of the construction formed therefrom when compared to ultra-hard and metal constructions that are joined together using conventional braze joint designs and/or materials.

BACKGROUND OF THE INVENTION

The use of constructions comprising ultra-hard and metallic components that are joined together is well known in the art. An example of such can be found in the form of cutting elements comprising an ultra-hard component that is joined to a metallic component. In such cutting element embodiment, the wear or cutting portion is formed from the ultra-hard component and the metallic portion of the cutting element is attached to the wear and/or cutting device. In an example embodiment, the ultra-hard component can be formed from a polycrystalline material such as polycrystalline diamond (PCD), polycrystalline cubic boron nitride (PcBN), or the like, that has a degree of wear and/or abrasion resistance that is greater than that of the metallic component. In particular examples, the ultra-hard component can be formed from PCD that has been formed or treated so that it is substantially free of a catalyst material that is used to form the same and comprises bonded-together diamond crystals.

Conventionally known constructions, comprising such ultra-hard and metallic components, are typically attached to one another using a braze material. The use of a braze material to attach the two components is needed to provide a desired attachment bond as the ultra-hard and metallic components are not themselves capable of forming an adequate bond to one another, e.g., when subjected to high-pressure/high temperature conditions. However, the use of a single-type of braze material to attach the two different components together does not provide a satisfactory degree of attachment for certain demanding wear and/or cutting applications, e.g., where the construction is provided in the form of a cutting element that is attached to a bit used for drilling subterranean formations. This is because a single-type of braze material is not capable of accommodating the vast differences in thermal expansion characteristic for the ultra-hard and metallic component.

Further, using a single-type of braze material makes it very difficult to provide an attachment bond to each of the ultra-hard and metallic components that are equal in strength. Since the ultra-hard and metallic components have different material properties and chemistries, any single-type of braze material that is used to form an attachment therebetween will provide a bond having a compromised degree of bond strength, e.g., where the single-type of braze material can be formulated to provide a strong bond to one component but at the expense of a weakened bond to the other component.

An attempt to address the need to provide an optimized attachment bond within constructions comprising ultra-hard and metallic components has involved the use of an intermediate material interposed between the ultra-hard and metallic components. This attempt involved the formation of a braze joint design that made use of an intermediate material formed from a refractory metal, and use of the same type of braze material interposed between the ultra-hard component and the intermediate material, and interposed between the metallic component and the intermediate material.

While the use of such braze joint design, comprising an intermediate layer and the same type of braze material, has been somewhat helpful in addressing the differences in the thermal expansion characteristic of the ultra-hard and metallic components, and in achieving an improvement in bond strength within the construction, such improvements are still not sufficient to meet the demands of certain wear and/or cutting applications, e.g., when the construction is used as a cutting element in a drill bit for drilling earthen formations where it is subjected to extreme conditions of heat and impact.

It is, therefore, desired that constructions comprising ultra-hard and metallic components be engineered in a manner having an improved braze joint that is specially designed to provide a desired level of ductility to address any differences in expansion characteristics between the ultra-hard and metallic components. It is further desired that such braze joint be capable of providing an optimum level of bond strength within the construction to enable the construction to withstand use in certain demanding wear and/or cutting applications, thereby extending the services life of such constructions when compared to ultra-hard and metallic constructions configured having a conventional braze joint.

SUMMARY OF THE INVENTION

Ultra-hard and metallic constructions that are prepared according to principles of this invention comprise an ultra-hard component that includes a working surface. In an example embodiment, the ultra-hard component has a hardness of about 4,000 HV or greater, and in a preferred embodiment the ultra-hard material is TSP. A metallic component is attached to the ultra-hard component. In an example embodiment, the metallic component can be selected from materials including carbides, borides, and nitrides from groups IVA, VA, and VIA of the periodic table, Co, Ni, Fe, W, Mo, Cu, Al, Nb, Ti, Ta, and alloys thereof, and in a preferred embodiment is WC—Co.

A feature of ultra-hard and metallic constructions of this invention is the use of a specially engineered braze joint for attaching the ultra-hard and metallic components to one another. The braze joint is interposed between the ultra-hard component and the metallic component, and comprises a first braze material that is bonded to a surface of the ultra-hard component. In an example embodiment, the first braze material includes an active material that reacts with an element of the ultra-hard component to provide a desired bond strength therewith.

The braze joint includes an intervening layer in direct contact with the first braze material, and that is formed from a rigid material. Example materials useful for forming the intervening layer include Ta, W, Mo, Nb and alloys thereof, other refractory metals, ceramic materials, cermets, and combinations thereof. In a preferred embodiment, the intervening layer is formed from Mo.

The braze joint further comprises a second braze material that is interposed between the intervening layer and the metallic component. The second braze materials is different from the first braze material, and is used to provide a desired bond strength between the intervening layer and the metallic component. The interface between the ultra-hard component, intervening layer, and/or metallic component can be planar or nonplanar.

The braze joint is specially designed to provide a desired level of ductility to address the differences on expansion characteristics between the ultra-hard component, intervening layer, and/or metallic component. Through the use of the two different braze materials, the braze joint is also capable of providing an optimum level of bond strength within the construction to enable the construction to withstand use in certain demanding wear and/or cutting applications, thereby extending the services life of such constructions when compared to ultra-hard and metallic constructions configured having a conventional braze joint, i.e., formed from a single type of braze material.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
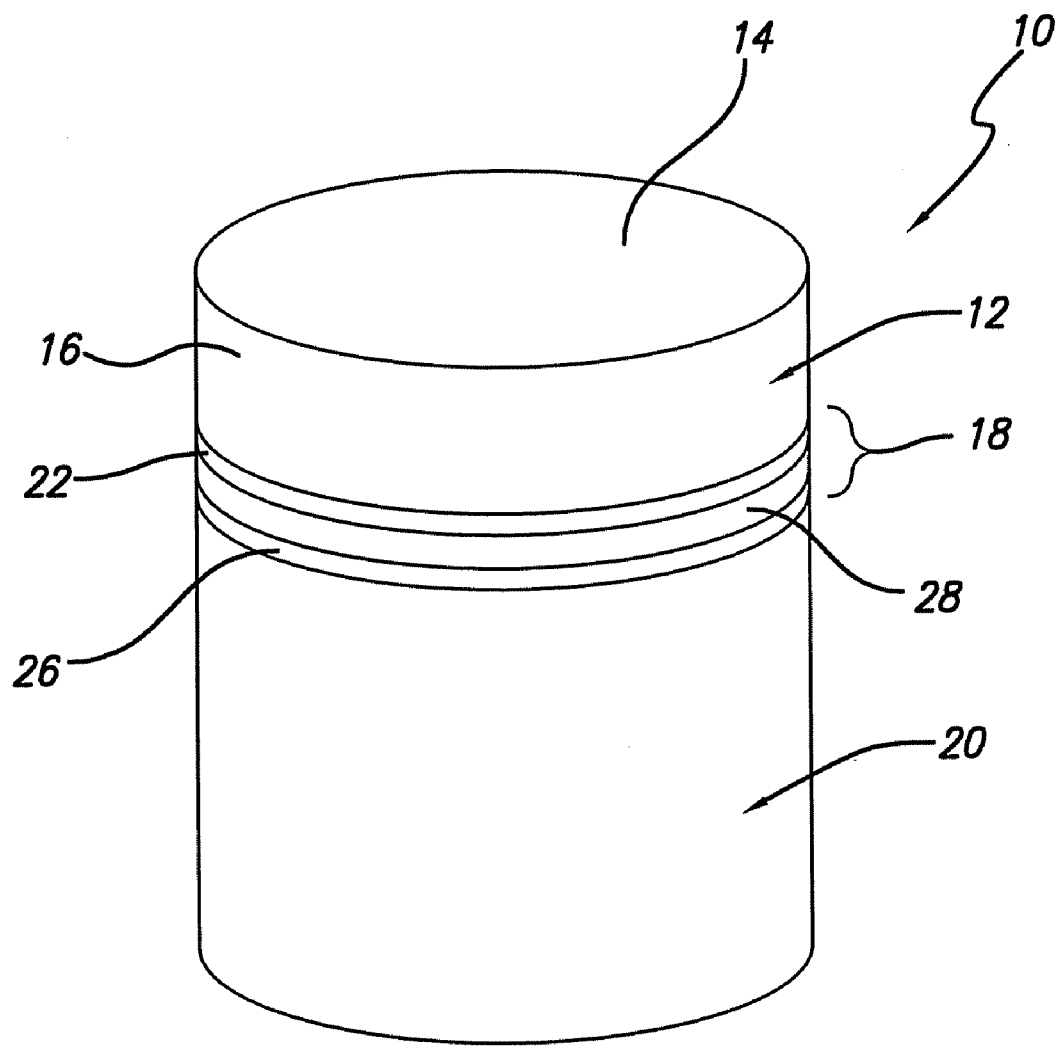
FIG. 1 is perspective side view of an ultra-hard and metallic construction comprising a braze joint in accordance with the principles of this invention.

Ultra-hard and metallic constructions of this invention comprise an ultra-hard component that, in an example embodiment, is configured to perform a wear and/or cutting function, and comprises a metallic component that is attached to the ultra-hard component and that, in an example embodiment, is configured to facilitate attachment of the construction an end-use wear, cutting, and/or machining device. The construction further comprises a braze joint that comprises a first braze material, an intervening layer, and a second braze material, wherein the first braze material is specially formulated to facilitate attachment of the ultra-hard component to the intervening layer, and the second braze material is specially formulated to facilitate attachment of the metallic component to the intervening layer.

In an example embodiment, the thicknesses of the first and second braze materials can be the same or different, e.g., as desired to accommodate the different yield stresses of the braze materials. In an example embodiment, the intervening layer is formed from a material that is wettable to the first and second braze materials, that may or may not react with an active element in one or both of the braze materials, that has a melting temperature above that of the braze materials, and that has no or a very limited solubility in both braze materials.

As used here, the term "ultra-hard" as used to refer to the ultra-hard component is understood to include those materials known in the art as having a grain hardness of about 4,000 HV or greater. Such ultra-hard materials can include those capable of demonstrating physical stability at temperatures above about 750° C., and for certain applications above about 1,000° C., that are formed from consolidated materials. Such ultra-hard materials can include but are not limited to diamond, cubic boron nitride (cBN), diamond-like carbon, boron suboxide, aluminum manganese boride, and other materials in the boron-nitrogen-carbon phase diagram which have shown hardness values similar to cBN and other ceramic materials.

Polycrystalline diamond is a useful material for forming the ultra-hard component once it has been treated to remove, render substantially free of, or otherwise render noncatalytic a catalyst material used to form the same, or that has otherwise been formed without the use of a catalyst material, e.g., such as diamond formed by chemical vapor deposition or the like. Such forms of PCD shall hereafter be referred to as thermally stable diamond (TSP). As used herein, the term "catalyst material" refers to a material that facilitates diamond-diamond bonding at certain pressure and/or temperature conditions to form the polycrystalline diamond. Another material useful for forming the ultra-hard component of constructions of this invention include polycrystalline cubic boron nitride (PcBN).

Such TSP has a material microstructure characterized by: 1) a polycrystalline phase comprising bonded together diamond grains or crystals and a plurality of voids or pores in the polycrystalline phase; or 2) a polycrystalline phase comprising diamond grains or crystals and a second phase of non-solvent catalyst material mixed with diamond grains. The non-solvent catalyst material can be in the form of a reaction product with the diamond grains after high-pressure/high-temperature processing. In an example embodiment, the reaction product can be formed by reacting a non-solvent catalyst material known to form a relatively thermally stable compound, e.g., a carbide, with the polycrystalline phase.

The ultra-hard component useful for making ultra-hard and metallic constructions of this invention may or may not include materials having a polycrystalline microstructure. In an example embodiment, useful ultra-hard materials can include polycrystalline materials that are known to display a desired degree of thermal stability to thereby facilitate use of the constructions in high temperature wear, cutting, and/or machining applications. Examples of such polycrystalline ultra-hard materials include but are not limited to TSP, PcBN, mixtures thereof and the like. In an example embodiment, constructions of this invention are formed by using TSP as the ultra-hard component.

TSP includes a polycrystalline material phase and a plurality of voids or pores within the polycrystalline phase. In an example embodiment, the polycrystalline phase comprises intercrystalline bonded diamond that is formed by bonding together adjacent diamond grains or crystals at high-pressure/high-temperature (HPHT) conditions. The bonding together of the diamond grains at HPHT conditions is facilitated by the use of an appropriate catalyst material. In an example embodiment, the catalyst material is a metal solvent catalyst. In such example embodiment, the plurality of voids or pores is disposed interstitially between the bonded together diamond grains.

Diamond grains useful for forming the ultra-hard component of constructions of this invention include natural and/or synthetic diamond powders having an average diameter grain size in the range of from submicrometer in size to 100 micrometers, and more preferably in the range of from about 1 to 80 micrometers. The diamond powder can contain grains having a mono or multi-modal size distribution. In an example embodiment, the diamond powder has an average particle grain size of approximately 20 micrometers. In the event that diamond powders are used having differently sized grains, the diamond grains are mixed together by conventional process, such as by ball or attritor milling for as much time as necessary to ensure good uniform distribution.

The diamond grain powder is preferably cleaned, to enhance the sinterability of the powder by treatment at high temperature, in a vacuum or reducing atmosphere. The diamond powder mixture is loaded into a desired container for placement within a suitable HPHT consolidation and sintering device.

The diamond powder may be combined with a desired catalyst material, e.g., a solvent metal catalyst, in the form of a powder to facilitate diamond bonding during the HPHT process and/or the catalyst material can be provided by infiltration from a substrate positioned adjacent the diamond powder and that includes the catalyst material. Suitable catalyst materials include metal solvent catalysts such as those selected from Group VIII elements of the Periodic table that are conventionally used to form PCD. A particularly preferred metal solvent catalyst is cobalt (Co).

Suitable substrates useful for as a source for infiltrating the catalyst material can include those used to form conventional PCD materials. A feature of such substrate is that it includes a metal solvent catalyst that is capable of melting and infiltrating into the adjacent volume of diamond powder to facilitate the formation of diamond-to-diamond intercrystalline bonding during the HPHT process. As noted above, suitable metal solvent catalyst materials include those selected from Group VIII elements of the Periodic table. A particularly preferred metal solvent catalyst is cobalt (Co), and a preferred substrate material is cemented tungsten carbide (WC—Co).

Alternatively, the diamond powder mixture can be provided in the form of a green-state part or mixture comprising diamond powder that is combined with a binding agent to provide a conformable material product, e.g., in the form of diamond tape or other formable/conformable diamond mixture product to facilitate the manufacturing process. In the event that the diamond powder is provided in the form of such a green-state part, it is desirable that a preheating step take place before HPHT consolidation and sintering to drive off the binder material. In an example embodiment, the PCD material resulting from the above-described HPHT process may have diamond volume content in the range of from about 85 to 95 percent.

The diamond powder mixture or green-state part is loaded into a desired container for placement within a suitable HPHT consolidation and sintering device. The HPHT device is activated to subject the container to a desired HPHT condition to effect consolidation and sintering of the diamond powder. In an example embodiment, the device is controlled so that the container is subjected to a HPHT process having a pressure of 5,000 MPa or greater and a temperature of from about 1,350° C. to 1,500° C. for a predetermined period of time. At this pressure and temperature, the solvent metal catalyst melts and infiltrates into the diamond powder mixture, thereby sintering the diamond grains to form PCD.

While a particular pressure and temperature range for this HPHT process has been provided, it is to be understood that such processing conditions can and will vary depending on such factors as the type and/or amount of metal solvent catalyst used, as well as the type and/or amount of diamond powder used to form the PCD region. After the HPHT process is completed, the container is removed from the HPHT device, and the so-formed PCD material is removed from the container.

In the event that a substrate is used during the HPHT process, e.g., as a source of the catalyst material, such substrate may be removed prior to treating the PCD material to remove the catalyst material therefrom to form the TSP material. Alternatively, the substrate can remain attached and removed prior to attachment of the TSP material by the braze joint. Removing the substrate at this stage is desired for the purpose of expediting the process of removing the catalyst material from the PCD body.

The term "removed", as used with reference to the catalyst material after the treatment process for forming TSP, is understood to mean that a substantial portion of the catalyst material no longer resides within the polycrystalline phase. However, it is to be understood that some small amount of catalyst material may still remain in the microstructure of the TSP material, e.g., within the interstitial regions and/or adhered to the surface of the diamond crystals. Under some thermodynamic circumstances, some small amount of catalyst material may react with other compounds present in the material during sintering. In such circumstances, both the catalytic function and the ability of a post-sintering operation to remove this reacted compound are greatly compromised. Accordingly, such small amount of the catalyst material may reside within the polycrystalline matrix material after the treatment process. Additionally, the term "substantially free", as used herein to refer to the catalyst material in the TSP material after the treatment process, is understood to mean that there may still be some small/trace amount of catalyst material remaining within the TSP material as noted above.

In an example embodiment, the PCD material is treated to render the entire body substantially free of the catalyst material. This can be done, for example, by removing substantially all of the catalyst material therefrom by suitable process. Example processes useful for removing the second phase material include chemical treatment such as by acid leaching or aqua regia bath, electrochemically such as by electrolytic process, by liquid metal solubility, or by liquid metal infiltration that sweeps the existing catalyst material away and replaces it with another noncatalyst material during a liquid phase sintering process, or by combinations thereof. In an example embodiment, the catalyst material is removed from the PCD material by an acid leaching technique, such as that disclosed for example in U.S. Pat. No. 4,224,380.

Alternatively, TSP materials useful for forming constructions of this invention may be formed such that they have a material microstructure comprising a polycrystalline phase and a second phase that may or may not be a reaction product of the polycrystalline phase and another material, e.g., a nonsolvent catalyst material can be infiltrated or otherwise introduced. For example, the TSP material can comprise diamond grains that are not bonded directly to one another, but rather are bonded to one another via the presence of a reaction product. Since this type of TSP material does not include a metal solvent catalyst, there is no need for subsequent treating as described above. Accordingly, TSP materials useful for forming construction of this invention may or may not comprise empty interstitial regions. For example, TSP materials can comprise interstitial regions that are filled with a desired material, e.g., with a noncatalytic material.

As used herein, the term "solvent catalyst" is understood to refer to those types of materials typically used to form PCD during HPHT conditions, and/or that can operate to cause an unwanted change in the nature of the polycrystalline material during operation of the construction in a wear and/or cutting operation. For example, when the polycrystalline ultra-hard material is polycrystalline diamond, it is desired that the non-solvent catalyst be a material that does not cause graphitization of the polycrystalline diamond during operating temperatures.

Example materials useful for forming the non-solvent catalyst in such TSP material embodiment include those materials capable of reacting with the polycrystalline phase material to form a compound that can bond together with the polycrystalline phase material, and/or that can react with the diamond grains to form a reaction product therebetween, e.g., such that the diamond grains are not directly bonded together. In an example embodiment, wherein the polycrystalline phase material is polycrystalline diamond, the non-solvent catalyst is silicon (Si) that reacts with the carbon in the polycrystalline diamond to form silicon carbide (SiC).

The ultra-hard component can be configured differently depending on the end-use wear, cutting and/or machining application. In an example embodiment, the ultra-hard component is configured in the shape of a tablet or disk having a defined axial thickness and diameter. Alternatively, the ultra-hard component can be configured in the form of a segment or a sector to provide a single or multiple wear and/or cutting surface depending on the particular end-use application.

The ultra-hard component may be configured having a homogeneous material microstructure or having a material microstructure that changes as a function of position. For example, when the ultra-hard component is provided in the form of TSP, the TSP material can have a different diamond density, e.g., that changes in a gradient or stepped fashion as a function of position. Additionally, when provided in the form of the TSP, the ultra-hard component can comprise one or more regions populated by different diamond grain sizes, e.g., that changes in a gradient or stepped fashion as a function of position. It is to be understood that these are but a few examples of how the ultra-hard component material microstructure may not be uniform throughout, and that other examples of nonuniformity are intended to be covered within the scope of this invention.

Additionally, the ultra-hard component has a working surface that may or may not be specially configured. The working surface can be a top, upper surface, or table of the ultra-hard component and/or can be a side surface of the ultra-hard component extending axially along all or a portion of the ultra-hard component. In an example embodiment, the ultra-hard component can have a beveled section or a chamfer defining a circumferential edge of the top surface, which bevel can be formed having an angle that will vary depending on the particular end-use application.

As used herein, the term "metallic component" is understood to include those materials commonly known by those skilled in the art to be metals and/or alloys thereof. Additionally, metals useful for forming the metallic component in this construction can include cermet materials that include both ceramic and metallic elements, e.g., in the form of ceramic particles bonded with a metal. Examples of metals and cermet materials useful for forming the metallic component include, but are not limited to, carbides, borides, and nitrides from groups IVA, VA, and VIA of the periodic table, Co, Ni, Fe, W, Mo, Cu, Al, Nb, Ti, Ta, and alloys thereof. In an example embodiment, where the ultra-hard component is TSP, a desired metallic component is formed from WC—Co.

The metallic component can be configured differently depending on the end-use wear, cutting and/or machining application. In an example embodiment, the metallic component is configured in the shape of a tablet or disk having a defined axial thickness and diameter. In an example embodiment, the metallic component has generally the same diameter as the ultra-hard component to provide a desired degree of support thereto. Additionally, the metallic component may have an outside surface configured to facilitate attachment with the end-use wear, cutting and/or machining device. The metallic component can be configured for attachment with such end-use device by interference fit and/or by brazed or welded attachment.

Figure 2:
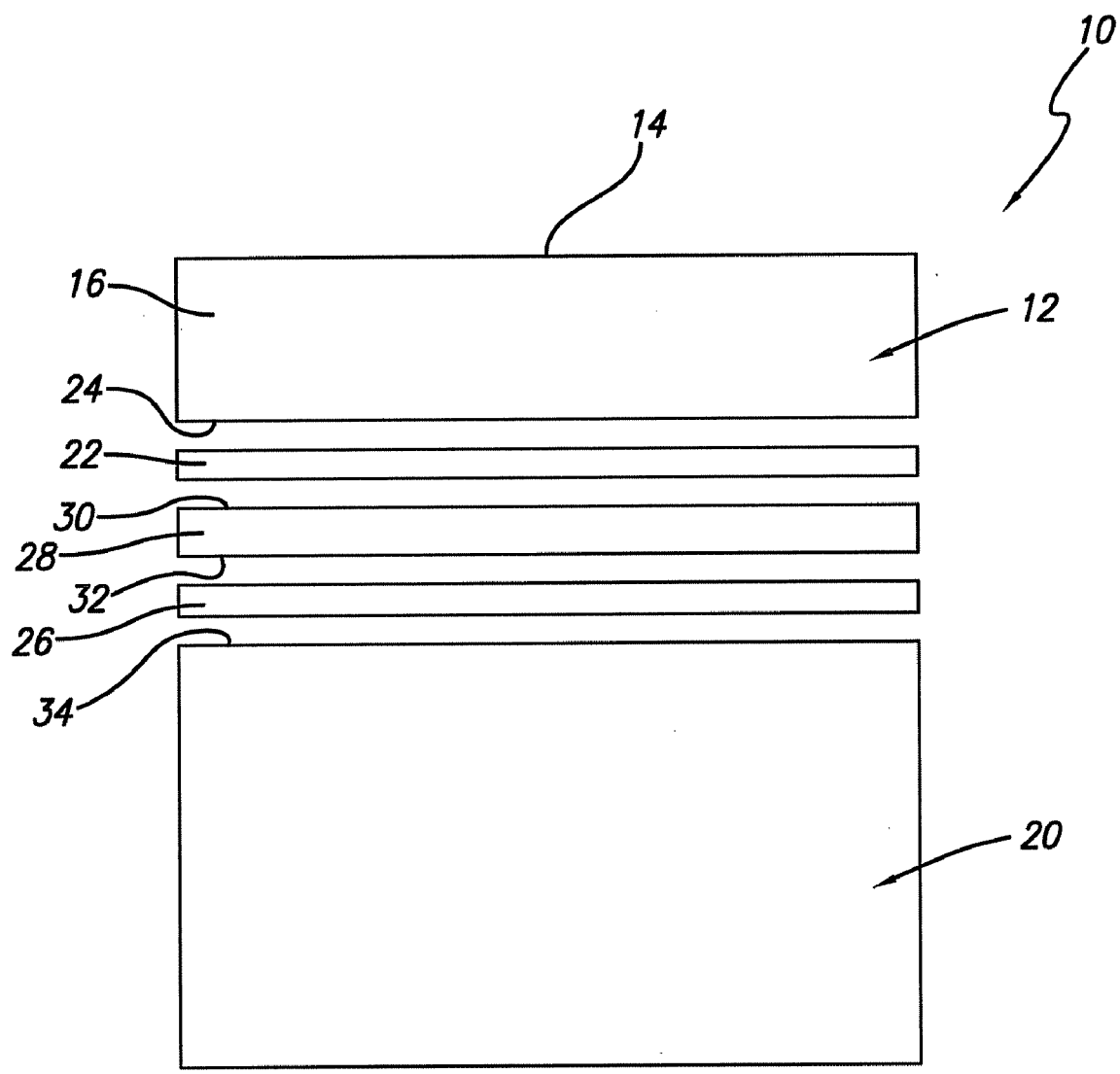
FIG. 2 is an exploded side view of the construction of FIG. 1.

FIGS. 1 and 2 illustrate an example embodiment ultra-hard and metal construction 10 prepared according to principles of this invention comprising an ultra-hard component 12 that in this embodiment is configured having a body that is in the form of a cylindrical disc. The ultra-hard component includes a top surface 14 and a side surface 16 that may or may not include a portion thereof that is a working surface. Additionally, the ultra-hard component may include one or more surface features that are provided to facilitate use of the construction in its end-use application. For example, the ultra-hard component may include a chamfer or a beveled surface section between the top and side surfaces, e.g., extending circumferentially around an edge of the top surface.

Moving axially downwardly from the ultra-hard component 12, the construction 10 includes a braze joint 18 that is interposed between the ultra-hard component 12 and a metallic component 20. The braze joint 18 comprises, moving axially away from the ultra-hard component, a first braze material 22 that is bonded or otherwise attached to a bottom surface 24 of the ultra-hard component 12. The braze joint 18 further includes a second braze material 26, and an intervening layer 28 that is interposed between the first and second braze materials 22 and 26.

In an example embodiment, the first braze material 22 is formed from a material that is capable for forming a strong chemical bond between the ultra-hard component and the intervening layer. It is desired that the first braze material 22 includes one or more elements that are capable of reacting with one or more elements in the ultra-hard component to form such strong chemical bond. For this reason, materials useful for forming the first braze material can be referred to as being "active" braze materials or alloys. Example materials useful for forming the first braze material include those selected from the group including Ag, Au, Cu, Ni, Pd, B, Cr, Si Ti, Mo, V, Fe, Al, Mn, Co, and mixtures and alloys thereof. Active elements for use in forming a first braze material with a TSP ultra-hard component include strong carbide formers such as B, Si, Ti, Mo, and V. In a preferred embodiment, the first braze material can include one or more active elements that are reactive with the carbon in the TSP, and the first braze material can include one or more nonreactive elements along with any active elements.

Conventional ultra-hard and metal constructions comprise a braze joint formed from a single braze material comprising an active element for the purpose of forming a strong chemical bond with the ultra-hard component. However, such active element in the single braze material can also react with the metallic component at the interface with the ultra-hard component. The occurrence of the reactions between the braze material and both the ultra-hard and metallic components at their interface can result in the formation of a brittle layer between the two components that ultimately reduced the service life of the construction. Ultra-hard and metallic constructions of this invention avoid this unwanted effect through the use of the braze joint 18 that comprises different braze materials and an intervening layer as further described below.

The braze joint intervening layer 28 is positioned axially below the first braze material 22, wherein the first braze material is interposed between and bonded to the ultra-hard component 12 and an upper surface 30 of the intervening layer 28. The intervening layer 28 is provided in the form of a rigid preformed element or part, and is formed from a material that is readily brazable by both the first and second braze materials 22 and 26.

Materials useful for forming the intervening layer 28 include refractory metals, ceramic materials, cermets, and combinations thereof. The intervening layer may or may not have a thermal expansion characteristic that is between that of the ultra-hard component and metallic component. It is also desired that the material used to form the intervening layer 28 not react with the active element in the first braze material selected to react with the ultra-hard component. Additionally, it is desired that the material selected for forming the intervening layer have a melting temperature that is greater than that of the first and second braze materials, and have no or very limited solubility in both the first and second braze materials. Example materials include Ta, W, Mo, Nb and alloys thereof, other refractory metals, ceramic materials, and combinations thereof. In an example embodiment where the first braze material that is used is a copper-based alloy having titanium as an active element, it is desired that the intervening layer be formed from the Ta, W, Mo, Nb and alloys thereof noted above.

Figure 6:
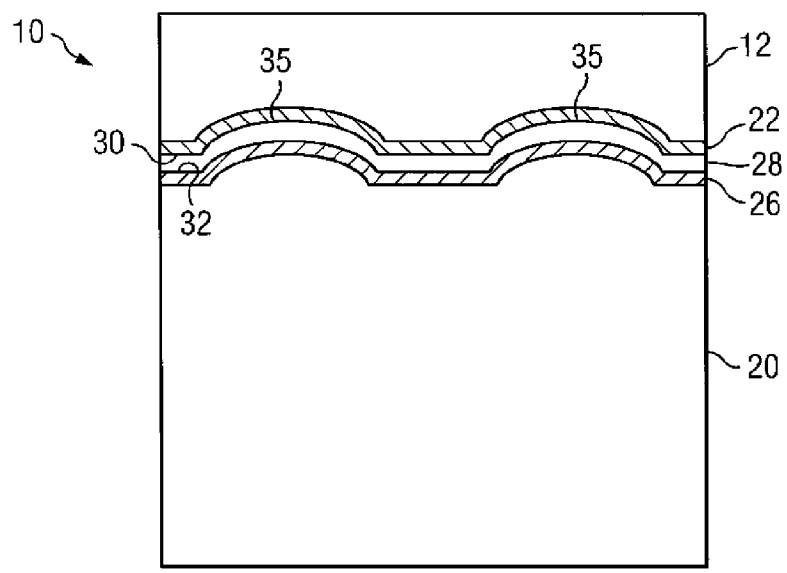
FIG. 6 is a side view of an ultra-hard and metallic construction according to an embodiment of the present disclosure.

While the intervening layer 28 is illustrated in FIGS. 1 and 2 in the form of a solid disc-shaped structure, it is to be understood that the intervening layer can be configured differently as called for by the particular end-use application. For example, as shown in FIG. 6, the intervening layer 28 can be provided in the form of a part having an upper surface 30 and/or a bottom surface 32 that are nonplanar, e.g., that include one or more surface features 35 giving rise to a nonplanar configuration. The use of such a nonplanar upper and/or lower surfaces can operate to increase the surface area of the intervening layer to thereby improve the bond strength within the bond joint. The use of nonplanar upper and/or lower surfaces can also operate to make crack propagation along one or both of the first and second braze materials-intervening layer interface more difficult.

Figure 7:
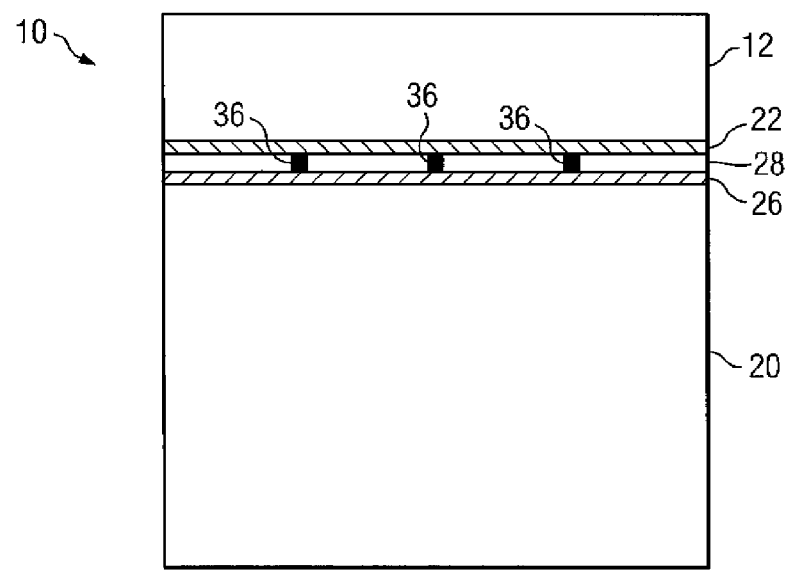
FIG. 7 is a side view of an ultra-hard and metallic construction according to an embodiment of the present disclosure.

Further, the intervening layer can be formed from a part having one or more holes or openings disposed partially or completely therethrough. FIG. 7 illustrates one such embodiment. The presence of such holes or openings 36 within one or both of the upper and lower surfaces (e.g., both surfaces 30, 32 in FIG. 7) can operate to improve the strength of the bond between the first 22 and/or second 26 braze materials and the intervening layer 28 by virtue of one or both of the first and second braze materials penetrating the holes or openings. Additionally, in the case where the intervening layer includes one or more holes 36 extending completely therethrough (as shown in FIG. 7), the penetration of the first and second braze materials into each other in the hole area can produce non-uniformity or residual thermal stress in the braze joint, thereby contributing to increased strength of the braze joint.

Still further, the intervening layer can be formed from a part characterized by a plurality of perforations, e.g., provided in the form of a wire mesh or the like. An intervening layer provided in this form would produce both types of benefits noted above for the intervening layer with a nonplanar interface and with holes or openings. Additionally, a mesh intervening layer would provide a strong mechanical interlocking between the intervening layer and the braze materials. Further, the use of such a mesh embodiment of the intervening layer could provide improved intervening layer strength if the material used to form the mesh is brittle.

The second braze material 26 is interposed between the bottom surface 32 of the intervening layer 26 and an upper surface 34 of the metallic component 20, and is used for forming a bond between the metallic component and the intervening layer. In an example embodiment, the material that is used to form the second braze material 26 is different from that used to form the first braze material, and is specially formulated to form an optimal bond with the metallic component. The term "different" as used to describe the first and second braze material is understood to cover situations where the braze materials may comprise an alloy formed from the same general elements but in different proportions, as well as comprising an alloy including one or more different elements. In an example embodiment, the second braze material does not include an active element that is a strong carbide former. Example materials useful for forming the second braze material include those selected from the group including Ag, Au, Sn, Cu, Ni, Pd, In, Cr, Fe, Al, Mn, Co, and mixtures and alloys thereof.

It is to be understood that the specific choice of material that will be used as the second braze material will depend on such factors as the types of materials used to form the intervening layer and the metallic component, as well as the end-use application.

Ultra-hard and metal constructions of this invention will be better understood with reference to the following example:

Example

An ultra-hard and metal construction was prepared by taking a disc-shaped tablet of leached PCD, wherein substantially all of a catalyst material (cobalt) was removed therefrom to form the ultra-hard component, i.e., TSP. The ultra-hard component had an axial thickness of approximately 2.5 millimeters and had a diameter of approximately 13.5 millimeters. The metallic component was provided in the form of a carbide substrate made from WC—Co. The metallic component had an axial thickness of approximately 13.3 millimeters and had a diameter of approximately 13.5 millimeters. The intervening layer was formed from Mo and had an axial thickness of approximately 0.1 millimeters and had a diameter of approximately 13.5 millimeters.

The ultra-hard component and metallic component were bonded together by the formation of the braze joint comprising the intervening layer and first and second braze materials. The second braze material is provided in the form of Palnicurom 10 alloy (Palnicurom 10 is a trade mark of Wesgo/GTE of Belmont, Calif., and comprises Au, Cu, Ni, Pd, and Mn.) and was applied to the upper surface of the metallic component. The intervening layer was disposed onto a surface of the second braze material, and a first braze material provided in the form of Copper ABA (a Copper active braze alloy comprising Cu, Si, Ti and Al) and was applied to the upper surface of the intervening layer. The ultra-hard component was disposed onto a surface of the first braze material.

The so-formed assembly was held in place by an appropriate device or technique, and the first and second braze materials were heated to their liquidus temperatures, during which time the first and second braze materials formed the desired braze joint and the desired bonds between the ultra-hard component and intervening layer, and metallic component and intervening layer. If desired, during the process of making the construction, one can use a temperature-dependent axial compression load to assist in eliminating any unwanted porosity and/or for controlling the thickness of the of the bond joints. Additionally, the intervening layer can be provided in the form of a refractory metal in the shape of an upright or inverted can for times when it is desired that the braze materials not diffuse into each other. For such example, the excess intervening layer material disposed along the side of the construction can be removed by grinding or the like after the brazing process has been completed so that the final construction appears similar to that illustrated in FIG. 1.

The so-formed construction had a final overall axial thickness of approximately 16 millimeters. In the final construction, the thickness of the first braze material was approximately 0.05 millimeters, and the thickness of the second braze material was approximately 0.05 millimeters.

The ultra-hard and metallic construction prepared according to this example was tested to determine its shear strength by the method of applying a load parallel to the interface such that the component breaks along the interface. The construction of this example had a shear strength of approximately 38.4 Kpsi. For purposes of reference and comparison, a conventional ultra-hard and metallic construction was prepared comprising a TSP ultra-hard component, and WC—Co metallic component, and having a braze joint formed from a single braze material formed from Copper-ABA alloy. The so-formed conventional ultra-hard and metallic construction had a shear strength measured according to the method described above of approximately 32.3 Kpsi. In comparison, the ultra-hard and metallic construction of this invention displayed an improved shear strength of approximately 19 percent over the conventional construction due to the improved bond strength provided by the unique braze joint described above.

While an example embodiment of an ultra-hard and metallic construction of this invention has been described above and illustrated in FIGS. 1 and 2, it is to be understood that such illustrated embodiment has been provided for purposes of reference, and that the dimensions of the different components of the construction and the braze joint bonding the same can and will be different than that illustrated depending on the particular end-use application. For example, FIGS. 1 and 2 generally illustrate the thickness of the first and second braze materials being the same. The thicknesses of the first and second braze material may be different.

For example, the first and second braze materials may have a thickness in the braze joint that correlates with the yield stress/strength of the particular braze materials that are being used. A layer of one braze material comprising an alloy with a higher yield stress may be thicker than a layer of another braze material comprising an alloy having a relatively lower yield stress. Thus, a feature of this invention is the use of a braze joint comprising different braze materials that may be provided in different thicknesses for the purpose of achieving an optimal combination of maximal braze joint strength, and a maximal stress relaxation in the braze joint during a cooling stage of the brazing process. Further, the thickness of the first and second braze materials may depend on the wetting and/or thermal expansion characteristics of the ultra-hard component, and/or intervening layer, and/or metallic component.

While the types of materials useful for forming the first braze material has been described above for one example embodiment, other types of materials can be used. For example, a braze material comprising two or more different active elements may be used for certain end-use applications. Such first braze material may comprise a first active element as noted above designed to react with an element in the ultra-hard component, and at least a second active element that is selected to react with an element in the ultra-hard component and/or an element in the intervening layer. A first braze material formulated in this matter would operate to provide a strong chemical bond with each of the ultra-hard component and the intervening layer in a manner that would not produce unwanted weakening at the ultra-hard component and intervening layer surfaces.

Materials useful for forming the additional active elements can be selected from those materials described above for making the first braze materials. In an example embodiment where the ultra-hard component is formed from TSP and the intervening layer is formed from the materials described above, a first braze material comprising the two or more active elements may be provided in the form of a copper-based alloy including Ti and Si as the active element, wherein one or more of these react with the ultra-hard component, and one can additionally react with the intervening layer component active element.

Alternatively, the second braze material of the braze joint can be formulated having one or more active elements, for the purpose of forming a bond with the metallic component and/or the intervening layer. For example, the second braze material can be formulated having a first active element that reacts with an element in the metallic component and/or a second active element that reacts with an element in the metallic component and/or an element in the intervening layer. The use of such a second braze material comprising one or more active elements will depend on the end-use application.

In addition to the properties of being active or nonactive, the first and second braze materials used to form ultra-hard and metallic constructions of this invention can be selected based on their characteristic liquid (liquidus) or solid/crystallization (solidus) temperatures for the purpose of facilitating forming the construction in a manner that intentionally reduces or eliminates the formation of residual thermal stresses in the resulting construction. Additionally, when ultra-hard and metallic constructions of this invention are to be attached to an end-use application device by welding or brazing technique, it is further desired that the first and second braze materials used to form the braze joint have a liquidus temperature that is higher than the welding or brazing temperature used to attach the construction. In an example embodiment, where the ultra-hard and metallic construction is provided in the form of a cutting element for attachment with a bit for drilling subterranean formations, it is desired that the first and second braze materials have a liquidus temperature that is above that used to join conventional cutting elements having WC—Co substrates to such drill bits.

Ultra-hard and metallic constructions of this invention can be used in a number of different applications, such as tools for mining, cutting, machining, milling and construction applications, wherein properties of shear strength, thermal stability, wear and abrasion resistance, mechanical strength, and/or reduced thermal residual stress are highly desired. Constructions of this invention are particularly well suited for forming working, wear and/or cutting elements in machine tools and drill and mining bits such as roller cone rock bits, percussion or hammer bits, diamond bits, and shear cutters used in subterranean drilling applications.

Figure 3:
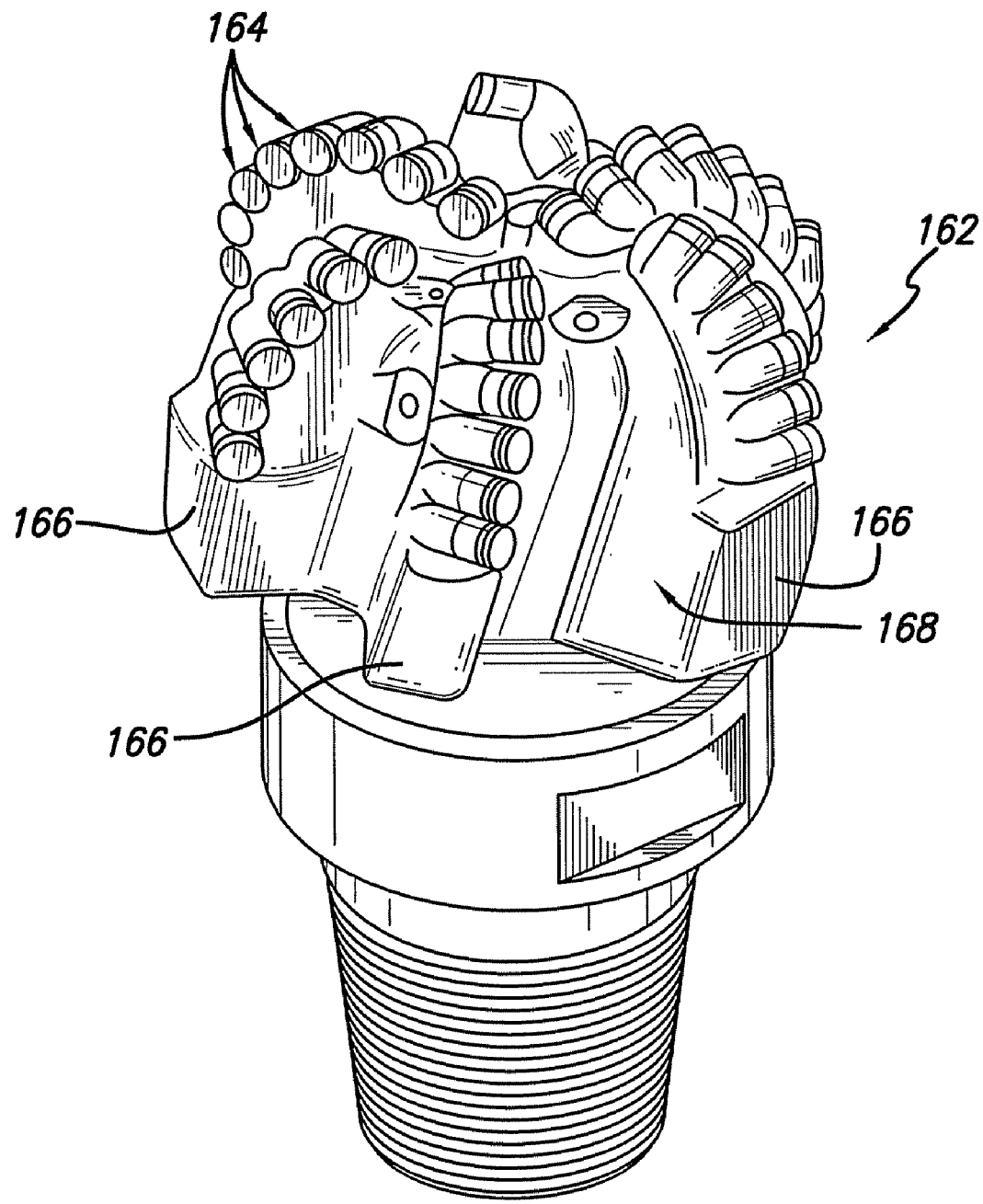
FIG. 3 is a perspective side view of a drag bit comprising a number of the ultra-hard and metallic constructions of this invention provided in the form of a shear cutter.

FIG. 3 illustrates a drag bit 162 comprising a plurality of cutting elements made from ultra-hard and metallic constructions of this invention configured in the form of shear cutters 164. The shear cutters 164 are each attached to blades 166 that extend from a head 168 of the drag bit for cutting against the subterranean formation being drilled. The shear cutters 164 are attached by conventional welding or brazing technique to the blades and are positioned to provide a desired cutting surface.

Figure 4:
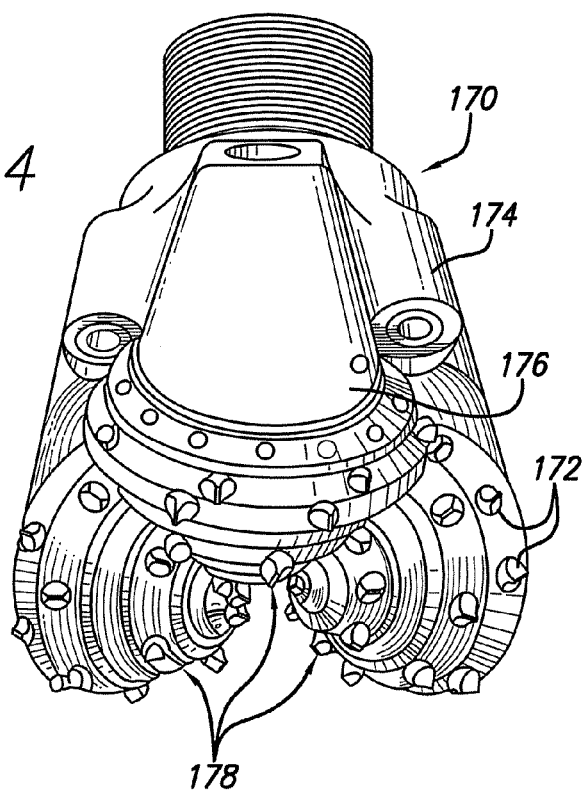
FIG. 4 is a perspective side view of a rotary cone drill bit comprising a number of the ultra-hard and metallic constructions of this invention provided in the form of inserts.

FIG. 4 illustrates a rotary or roller cone drill bit in the form of a rock bit 170 comprising a number of the ultra-hard and metallic constructions of this invention provided in the form of wear or cutting inserts 172. The rock bit 170 comprises a body 174 having three legs 176, and a roller cutter cone 178 mounted on a lower end of each leg. The inserts 172 can be formed according to the methods described above. The inserts 172 are provided in the surfaces of each cutter cone 178 for bearing on a rock formation being drilled. In an example embodiment, the inserts can be positioned along the gage and/or heel row of the drill bit.

Figure 5:
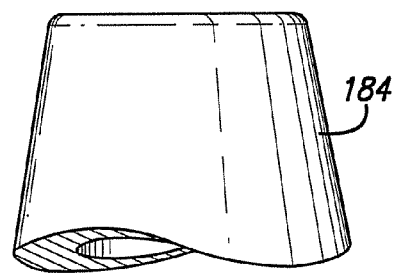
FIG. 5 is a perspective side view of a percussion or hammer bit comprising a number of the ultra-hard and metallic constructions of this invention provided in the form of inserts.
Figure 5:
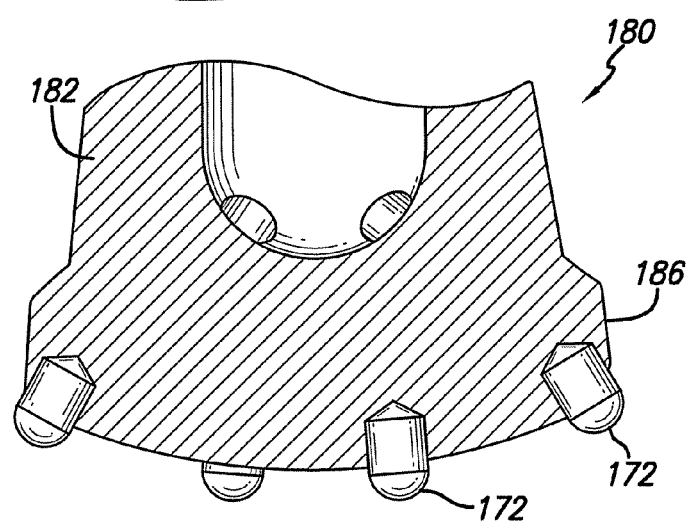

FIG. 5 illustrates the inserts described above as used with a percussion or hammer bit 180. The hammer bit comprises a hollow steel body 182 having a threaded pin 184 on an end of the body for assembling the bit onto a drill string (not shown) for drilling oil wells and the like. A plurality of the inserts 172 are provided in the surface of a head 186 of the body 182 for bearing on the subterranean formation being drilled.

Other modifications and variations of ultra-hard and metallic constructions comprising a braze joint including an intervening layer and two different braze materials as described above will be apparent to those skilled in the art. For example, ultra-hard and metallic constructions of this invention may comprise a braze joint having more than one intervening layer and having more than two different braze materials used to bond the more than one intervening layers to one another and to the respective ultra-hard and metallic component.

It is, therefore, to be understood that within the scope of the appended claims, this invention may be practiced otherwise than as specifically described.

What is claimed is:

1. An ultra-hard and metallic construction comprising:
an ultra-hard component including a working surface;
a metallic component that is attached to the ultra-hard component; and
a braze joint that is interposed between the ultra-hard component and the metallic component, wherein the braze joint comprises: a first braze material that is bonded to a surface of the ultra-hard component; an intervening layer that is in direct contact with the first braze material; and a second braze material that is interposed between the intervening layer and the metallic component, wherein the first and second braze materials are different.

2. The construction as recited in claim 1 wherein the ultra-hard component has a hardness of about 4,000 HV or more.

3. The construction as recited in claim 1 wherein the ultra-hard component is selected from the group consisting of diamond, cubic boron nitride (cBN), diamond-like carbon, boron suboxide, aluminum manganese boride, materials in the boron-nitrogen-carbon phase diagram which have shown hardness values similar to cBN and other ceramic materials, and combinations thereof.

4. The construction as recited in claim 1 wherein the metallic component is selected from the group consisting of carbides, borides, and nitrides from groups IVA, VA, and VIA of the periodic table, Co, Ni, Fe, W, Mo, Cu, Al, Nb, Ti, Ta, and alloys thereof.

5. The construction as recited in claim 1 wherein the first braze material includes an active element of a strong carbide former that reacts with an element in the ultra-hard component and is selected from the group consisting of B, Si, Ti, Mo, and V.

6. The construction as recited in claim 5 wherein the ultra-hard component is TSP and the first braze material further comprises an element selected from the group consisting of Ag, Au, Cu, Ni, Pd, Cr, Fe, Al, Mn, Co, and mixtures thereof.

7. The construction as recited in claim 5 wherein the first braze material includes a further reactive element that reacts with an element in the intervening layer.

8. The construction as recited in claim 7 wherein the first braze material comprises a Cu-based alloy and the active elements comprise Si and Ti.

9. The construction as recited in claim 5 wherein the second braze material does not include an active element of a strong carbide former.

10. The construction as recited in claim 1 wherein the second braze material includes one or more elements that reacts with one of the metallic component and the intervening layer.

11. The construction as recited in claim 1 wherein the intervening layer is selected from the group consisting of Ta, W, Mo, Nb, and combinations thereof.

12. The construction as recited in claim 1 wherein the intervening layer includes a nonplanar surface that interfaces with at least one of the ultra-hard component and the metallic component, and that is characterized by one or more surface features disposed therealong.

13. The construction as recited in claim 1 wherein the intervening layer includes a plurality of openings that extend therethrough.

14. A bit for drilling subterranean formations comprising a number of cutting elements that are attached thereto, wherein one or more of the cutting elements are formed from the ultra-hard and metallic construction as recited in claim 1.

15. The construction as recited in claim 1 wherein the first braze material comprises a Cu-based alloy including an active element of a strong carbide former of titanium; and the intervening layer is selected from the group consisting of Ta, W, Mo, Nb, and alloys thereof.

16. The construction as recited in claim 1 wherein the first braze material comprises a Cu-based alloy including an active element of a strong carbide former of titanium; the intervening layer is selected from the group consisting of Ta, W, Mo, Nb, and alloys thereof; and the second braze material comprises a Au and Cu based alloy that does not include an active element of a strong carbide former.

17. An ultra-hard and metallic construction comprising:
an ultra-hard component comprising bonded-together diamond grains that is substantially free of a catalyst material;
a metallic component comprising a cermet material, wherein the metallic component is attached to the ultra-hard component; and
a braze joint that is interposed between the ultra-hard component and the metallic component, wherein the braze joint comprises: a first braze material that includes an element that reacts with an element in the ultra-hard component and forms a bonded attachment to the ultra-hard component; an intervening layer that is in direct contact with the first braze material;
and a second braze material that is interposed between the intervening layer and the metallic component, wherein the first and second braze materials are different.

18. The construction as recited in claim 17 wherein the intervening layer is formed from a material selected from the group consisting of Ta, W, Mo, Nb and combinations thereof.

19. The construction as recited in claim 17 wherein the intervening layer includes a plurality of openings that extend therethrough.

20. The construction as recited in claim 17 wherein the second braze material includes an element that reacts with an element in one of the metallic component and the intervening layer.

21. The construction as recited in claim 17 wherein the first braze material includes a further element that reacts with an element in the intervening layer.

22. The construction as recited in claim 17 wherein the intervening layer includes a surface positioned adjacent one of the ultra-hard component and metallic component that is nonplanar.

23. A bit for drilling subterranean formations comprising: a body having a number of blades extending outwardly therefrom and a number of cutting elements attached to one or more of the blades, wherein at least one of the cutting elements comprises an ultra-hard and metallic construction comprising: an ultra-hard component comprising bonded-together diamond grains that is substantially free of a catalyst material; a metallic component comprising a cermet material, wherein the metallic component is attached to the ultra-hard component; and a braze joint that is interposed between the ultra-hard component and the metallic component, wherein the braze joint comprises: a first braze material that includes an element that reacts with an element in the ultra-hard component and forms a bonded attachment to the ultra-hard component; an intervening layer that is in direct contact with the first braze material; and a second braze material that is interposed between the intervening layer and the metallic component, wherein the first and second braze materials are different.

24. An ultra-hard and metallic construction comprising:
an ultra-hard component comprising bonded-together diamond grains that is substantially free of a catalyst material;
a metallic component comprising a cermet material, wherein the metallic component is attached to the ultra-hard component; and
a braze joint that is interposed between the ultra-hard component and the metallic component, wherein the braze joint comprises: a first braze material that is bonded to a surface of the ultra-hard component and comprises a Cu-based alloy and active elements comprising Si and Ti; an intervening layer that is in direct contact with the first braze material and is selected from the group consisting of Ta, W, Mo, Nb and combinations thereof; and a second braze material that is interposed between the intervening layer and the metallic component and comprises a Au and Cu based alloy that does not include an active element of a strong carbide former, wherein the first braze material reacts with an element in the ultra-hard component to form a bonded attachment to the ultra-hard component.

* * * * *